2,839,512

VINYLPYRIDINE LONG CHAIN ACRYLIC ESTER COPOLYMERS AND THEIR PREPARATION

Emmett R. Barnum, Lyman E. Lorensen, and John Zachar, Berkeley, Calif., assignors to Shell Development Company, New York, N. Y., a corporation of Delaware No Drawing. Application December 30, 1955
Serial No. 556,385

6 Claims. (Cl. 260—86.1)

This invention relates to new polymeric products. More particularly, the invention relates to a new class of nitrogen-containing copolymers which are particularly useful as detergents and anti-wear agents for lubricating compositions.

Specifically, the invention provides new an particularly useful polymeric products comprising oil-soluble copolymers of a vinylpyridine and an ester of an acrylic acid and a long chain aliphatic alcohol containing at least 10 carbon atoms, said copolymers having the vinylpyridine and the acrylic ester in a mole ratio varying from 1:10 to 4:1 and a molecular weight varying from $5 \times 10^4$ to $2.5 \times 10^6$ as determined by the light scattering method.

This application is a continuation-in-part of our application Serial No. 389,840, filed November 2, 1953, now abandoned.

It is an object of the invention to provide a new class of polymeric products. It is a further object to provide new nitrogen-containing oleophilic copolymers and a method for their preparation. It is a further object to provide new vinylpyridine copolymers which are particularly useful and valuable as additives for lubricating compositions. It is a further object to provide new additives for lubricating compositions which act both as ashless detergents and anti-wear agents. It is a further object to provide new vinylpyridine copolymers that are also useful as pour point depressants. It is a further object to provide new polymers which are particularly valuable as V. I. improvers. These and other objects of the invention will be apparent from the following detailed description thereof.

It has now been discovered that these and other objects may be accomplished by the novel polymeric products of the invention comprising oil-soluble copolymers of a vinylpyridine and an ester of an acrylic acid and a long chain aliphatic alcohol containing at least 10 carbon atoms, said copolymers having the vinylpyridine and the acrylic ester in a mole ratio varying from 1:10 to 4:1 and a molecular weight varying from $5 \times 10^4$ to $2.5 \times 10^6$ as determined by the light scattering method. It has been found that copolymers having these special features are particularly outstanding as additives for lubricating compositions. When they are incorporated into base lubricating compositions, even in very small amounts, they display unexpected anti-wear properties as well as detergent properties. Addition of 2% by weight of these polymers, for example, tends to reduce the wear 40 to 50% and reduce the formation of sludge as much as 70%. In addition, the new copolymers also act to reduce the pour point of the lubricating compositions. Furthermore the above copolymers also act as V. I. improvers. Compositions containing the new copolymers, for example, have V. I. values from 1.5 to 3 times that of the base lubricant. Further advantage is found in the fact that these special copolymers have excellent compatibility characteristics and are compatible with many additives, such as anti-oxidants, extreme pressure additives, etc., which are incompatible with most polymeric materials. Superiority of the new copolymers in these applications is shown in the examples at the end of the specification.

The vinylpyridines used in making the special copolymers may be exemplified by 2-vinylpyridine, 3-vinylpyridine, 4-vinylpyridine, 2-methyl-5-vinylpyridine, 4-methyl-2-vinylpyridine, 5-ethyl-2-vinylpyridine and 2-butyl-5-vinylpyridine, and the like. Particularly preferred groups comprise 2-, 3- and 4-vinylpyridines and the lower alkyl-substituted derivatives thereof.

The monomers to be copolymerized with the vinylpyridines include the esters of acrylic acids and the long chain aliphatic alcohols. Examples of the acrylic acids include acrylic acid and the alpha-substituted acrylic acids such as methacrylic acid, ethacrylic acid, alpha-phenyl acrylic acid, alpha-cyclohexyl acrylic acid and chloroacrylic acid. The long-chain aliphatic alcohols used in the esterification of these acids may be exemplified by decyl, lauryl, cetyl, stearyl, eicosanyl, nondecanyl, and the like alcohols and mixtures thereof. Particularly preferred esters to be used are the acrylic acid and methacrylic acid esters of aliphatic monohydric alcohols, and especially alkyl alcohols, containing from 14 to 20 carbon atoms.

Examples of the acrylic acid esters used in making the copolymers include, among others, decyl acrylate, lauryl acrylate, stearyl acrylate, decyl methacrylate, lauryl methacrylate, cetyl methacrylate, stearyl methacrylate, eicosanyl acrylate, docosanyl acrylate and the like, and mixtures thereof.

It has also been unexpectedly found that if one employs certain mixtures of the above-noted acrylic acid esters, they obtain copolymers which are distinguished from the others in that they have surprisingly high pour point and V. I. properties. Thus, when one employs a mixture of (1) a $C_{16}$ to $C_{20}$ ester of an acrylic acid and (2) a $C_{10}$ to $C_{14}$ ester of an acrylic acid with the above-noted vinylpyridines, they obtain special copolymers which give almost twice the pour point and V. I. properties obtained with the other copolymers. These mixtures preferably contain the higher esters and the lower esters in a mole ratio varying from 1:1 to 1:3.

The copolymers of the present invention are prepared by heating one or more of the above-described vinylpyridines with one or more of the above-described acrylic acid esters in the presence of a polymerization initiator under conditions so as to form a copolymer having the monomers in the critical ratio and having a molecular weight in the desired range.

As noted above, the copolymers of the invention must have the vinylpyridine and the acrylic acid ester in a ratio varying from 1:10 to 4:1, and more preferably in a ratio of 1:8 and 4:1.

As the vinylpyridines and the acrylic esters have different polymerization rates, the proportions in which they enter the copolymer molecule will differ from the proportions in which they occur in the reaction mixture. It will be necessary, therefore, to determine beforehand the ratio of concentrations of monomers needed to give copolymers having the two monomers in the necessary ratio. This can be easily accomplished by conducting a few routine runs and examining the composition of the resulting copolymer. The initial concentration of monomers can then be adjusted so as to give the copolymer of the desired composition.

As the reaction progresses, the monomer concentration ratios change due to the difference in the rate of polymerization and, in some cases, the ratio will change so that it will not be producing copolymers having the monomers in the desired ratio. The superior products are, therefore, obtained by employing some steps during the copolymerization which will insure that the ratio of concentrations of monomers does not vary during the reaction period from the above-described limits. This may be accomplished in a variety of ways. One way, for example, comprises stopping the copolymerization after the ratio of the monomer concentrations has reached the limiting value. This method is of particular value if the change in the ratio between the monomer concentrations during copolymerization is slow and a considerable yield of copolymer has been obtained before the limiting values have been attained.

Another method is to adjust the ratio between the monomer concentrations by adding monomer during the course of the polymerization. In this case, it is usually sufficient to add the monomer which is consumed the fastest. Such additions may be periodic or continuous.

Control over the change of ratio can be made by periodic withdrawal of samples and analyzing the product, or can be made in a homogeneous system by simply observing a physical property of the mixture which varies with the ratio of concentrations of monomers, such as boiling point, refractive index, vapor pressure, specific gravity and the like, and adding the monomer or monomers so as to bring the value up to the predetermined level for the desired product.

Copolymers of the present invention which have the superior properties noted above are those having molecular weights between 50,000 and 2,500,000 as determined by the light scattering technique described in Chem. Rev., vol. 40, page 319 (1948). Preferably, the molecular weights range from about 75,000 to 1,000,000 and more preferably from 100,000 to 650,000.

Any suitable conditions may be employed to maintain the molecular weight within the desired range. Factors which exert an influence on the molecular weight of the polymer include the method of polymerization (e. g., polymerization in emulsion, suspension, solvent solution or bulk), the nature and concentration of the catalyst employed, the temperature, and nature and amount of the monomers. When the polymerization is accomplished in solution, the molecular weight of the product will be lower when the dilution is stronger, i. e., when the concentration of solvent is greater. With the same catalyst, the higher polymerization temperature tends to give lower molecular weights.

Polymerization initiators that are particularly suited for use in preparing the claimed copolymers include various free-radical yielding catalysts as peroxide catalysts, such as, for example, benzoyl peroxide, lauroyl peroxide, tertiary butyl hydroperoxide, 2,2-bis(tertiary butyl peroxy) butane, di(tertiarybutyl) peroxide, tertiary butyl perlargonate, hydrogen peroxide, sodium or potassium persulfate, percarbonate, peracetic acid and the like. Other suitable catalysts include sodium bisulfite, diethyl sulfoxide, azo compounds, such as alpha,alpha-azodiisobutyrylonitrile and the like. The amount of the initiator added may vary over a considerable range. In general, the amount of initiator added will vary from 0.1% to 5% by weight of the material being polymerized. Preferred amounts vary from 0.1% to 2% by weight.

The temperature selected will vary depending chiefly on the type of initiator selected, the desired rate of reaction and the molecular weight desired. Generally, the temperature will range from about 50° C. to 150° C., and more preferably from 60° C. to 120° C.

The polymerization may be conducted in the presence or absence of air. In most cases, however, it has been found desirable to conduct the polymerization in the absence of air, e. g., in the presence of an inert gas such as nitrogen. Atmospheric, reduced or superatmospheric pressure may be employed.

At the end of the polymerization, any unreacted monomer or monomers and/or solvents may be removed, preferably by distillation or by precipitation with appropriate solvents.

The copolymers of the present invention are substantially water-white to light colored viscous liquids to soft rubbery solids. They possess unexpected solubility and surface active properties which could not have been predicted and which enable them to be used for a wide variety of important applications. It has been found, for example, that the new polymers are particularly valuable as ashless detergents and anti-wear agents for lubricating oils and lubricating compositions and/or as pour point depressants and V. I. improvers. They are especially outstanding in these applications as they are readily soluble in the oils and compositions and when added even in small amount act to reduce wear, prevent formation of sludge and lower the pour point. Addition of 2% by weight of these polymers, for example, tend to reduce wear 40 to 50%, reduce the formation of sludge as much as 70%. The addition of the new copolymers also lower the pour point 30 degrees or more, and increase the V. I. values at least 1.5 and preferably 1.5 to 3 times that of the base lubricant. The lubricating stocks used for this purpose may be any natural or synthetic material having the desired lubricating properties. Thus, it may be a hydrocarbon oil obtained from a paraffinic, naphthenic, asphaltic or mixed base crude, and/or mixtures thereof. The viscosity of these oils may vary over a wide range such as from 100 SUS at 100° F. to 100 SUS at 210° F. The hydrocarbon oils may be blended with fixed oils such as castor oil, lard oil and the like and/or with synthetic lubricants such as polymerized olefins, copolymers of alkylene glycols and alkylene oxides, organic esters, e. g., 2-ethylhexyl sebacate, dioctyl polymers, e. g. dimethyl silicone polymer and the like. If desired, the synthetic lubricants may be used as the sole base lubricant or admixed with fixed oils and derivatives thereof. In addition, the base can be gasoline, ethyl fluids, fuel oils, greases, etc.

The novel coolymers are effective in the lubricating compositions in ranges varying from about 0.01% to about 10% and preferably from about 0.1% to 5% by weight of the oil.

In addition to the above-described novel copolymers, the lubricating oil compositions may be modified with other additives such as other pour point depressants, other viscosity index improvers, corrosion inhibitors, extreme pressure additives, anti-oxidants and the like. Among such materials are V. I. and pour point agents, e. g., high molecular weight polymers, e. g., "acryloids"; wax naphthalene condensation products, isobutylene polymers, alkyl-styrene polymers; corrosion inhibitors, e. g., inorganic and organic nitrites such as $NaNO_2$ or $LiNO_2$ and diisopropylammonium nitrite or dicyclohexyl-ammonium nitrite, metal organic phosphates, e. g., Ca or Zn dicyclohexylthiophosphate or methylcyclohexylthiophosphate; extreme pressure agents such as organic phosphites, phosphates and phosphonates, organic sulfides; anti-oxidants such as phenols and amines, e. g., octadecylamine, 26-ditert-butyl-4-methylphenol and the like.

To illustrate the manner in which the invention may be carried out, the following examples are given. It is to be understood, however, that the examples are for the purpose of illustration and the invention is not to be regarded as limited to any of the specific materials recited therein. Unless otherwise specified, parts disclosed in the examples are parts by weight.

In the examples, the molecular weights were determined by light scattering method and the ratio of vinylpyridines to alkyl ester was determined by analysis for nitrogen.

The tests run on the lubricating oil compositions containing the copolymers are described below:

I. FL-2 engine test—ORC Handbook.
II. Cold sludge test (Chev. engine).
   Test conditions: 15 and 6 hour cyclic periods consisting of 30 minutes cyclic followed by 1½ hour cooling period.
   Speed: 600 R.P.M. idle; 1600 R.P.M. cruise.
   Time: 27 hours (15 hours cyclic, 3 hours cruise, 6 hours cyclic, 3 hours cruise).
   Oil temp.: cyclic—7 to 66° C.
   Jacket temp. in: Cyclic—18 to 69° C.; out: 3 hrs. cruise 74° C.
   Fuel: Automotive.
   Oil req.: 2 gal.
   Oil change: 4 qt.
III. Ford EX-3 type test.
   Conditions:

| Cycle Time | Speed | BHP | Jacket Temp., ° F. |
| --- | --- | --- | --- |
| 2 hrs | 500 R.P.M. idle | 0 | 125 |
| 2 hrs | 2,500 | 45 | 100 |
| 2 hrs | 2,500 | 45 | 200 |

16 of these 6 hour cycles for 96 hours total time.
Oil required—5 qt., no make up.

IV. Lauson engine test (LH-L2).
   Conditions:
   Speed (R.P.M.) ............................................. 1050
   Load (H.P.) ................................................ 0.8
   Test (hrs.) ................................................ 60
   Oil temp., ° F ............................................. 225
   Jacket temp., ° F .......................................... 275
   Oil req., ml ...................................... 2000 (SAE 30)
   Oil change, ml ............................................. 1020

V. High-temperature detergency test: The high-temperature detergency is determined by measuring the electrical resistance of dispersions of 10% by weight carbon dispersal in a test oil. The "degree of deflocculation" is calculated as the ratio of resistance of the given system to the resistance of an undoped oil containing the same amount of carbon black, and at a constant temperature.
VI. Pour point, ° F. (D-396-39T).
VII. Viscosity temperature (R) determined by taking the viscosity of the composition at 100° F. (cps.) and dividing it by the viscosity at 210° F. (cps.).
VIII. Wear test: 144 ml. of 0.1 N H₂SO₄ is added to 36 ml. of test lubricant and heated to 50° C. and stirred at a constant speed for 4 hours. Cast iron strips which are immersed in the test solution for the duration of the test, were weighed before and after test and weight loss in grams determined.
IX. Thrust bearing corrosion and oxidation test: According to National Petroleum News, September 17, 1941, R-294 and Ind. and Eng. Chem., vol. 34, p. 183.

*Example I*

This example illustrates the preparation of a copolymer from 2-methyl-5-vinylpyridine and lauryl methacrylates and demonstrates the superior properties of the copolymer as an additive for lubricating oil compositions.

A. A mixture of about mole of lauryl methacrylate, 1 mole of 2-methyl-5-vinylpyridine and 0.4% wt. of benzoyl peroxide was placed in a suitable reaction vessel and the mixture reacted for a period of over 2 hours at 80–85° C. in a nitrogen atmosphere. The unreacted materials were stripped off at 185° C. and 1 mm. pressure. The resulting copolymer was rubbery solid containing around 3% nitrogen. Analysis showed the copolymer had the vinylpyridine and lauryl methacrylate in a mole ratio of 1:1.6 and a molecular weight of about 150,000.

B. Two percent of the copolymer produced above was added to mineral lubricating oil and the oil subjected to tests II and VIII. In test II, the mineral oil containing the copolymer contained 70 grams of sludge compared to 180 for the mineral oil without the additive. In test VIII, the use of the mineral oil containing the copolymer produced a wear (in grams) of 0.27 as compared to a wear of 0.55 for the mineral oil without the additive.

*Example II*

This example illustrates the preparation of a copolymer of 2-methyl-5-vinylpyridine and lauryl methacrylate having a mole ratio of 1:3.9 and a molecular weight of 100,000, and demonstrates the superior properties of the copolymer as an additive for lubricating oil compositions.

A. A mixture of 2 moles of lauryl methacrylate and 1 mole of 2-methyl-5-vinylpyridine and 0.4% wt. of benzoyl peroxide was placed in a suitable reaction vessel and the mixture reacted for a period of about 2 hours at 80° C. in a nitrogen atmosphere. The unreacted materials were stripped off at 185° C. and 1 mm. pressure. The resulting copolymer was a rubbery solid containing about 2% nitrogen. Analysis showed the copolymer had the vinylpyridine and the lauryl methacrylate in a mole ratio of 1:3.9 and a molecular weight of about 100,000.

B. Two percent of the copolymer produced above was added to mineral lubricating oil and the oil subjected to tests I and III. In test I, the composition containing the copolymer had a lacquer rating of 10 (perfect) compared to 4 for the control. In test III, the composition containing the copolymer had a sludge rating of 95.5 (100 perfect) as compared to a rating of 53 for the control.

*Example III*

This example illustrates the preparation of a copolymer from 4-vinylpyridine and lauryl methacrylate and demonstrates the superior properties of the copolymer as an additive for lubricating oil compositions.

A. A mixture of about 2 moles of lauryl methacrylate and 1 mole of 4-vinylpyridine and 0.4% wt. of benzoyl peroxide was placed in a suitable reaction vessel and the mixture reacted for a period of about 20 hours at 80° C. in a nitrogen atmosphere. The unreacted materials were stripped off at 185° C. and 1 mm. pressure. The resulting copolymer was a rubbery solid containing about 2.7% nitrogen. Analysis indicated the copolymer had the vinylpyridine and lauryl methacrylate in a mole ratio to 1:1.6 and a molecular weight of about 100,000.

B. Two percent of the above copolymer was added to mineral lubricating oil and the oil subjected to tests I and VI. In test I, the composition had a lacquer rating of 10 compared to a rating of 4 for the control and gave 60% wear as compared to 100 for the control. In test VI, the composition had a pour point of —10 as compared to +20 for the control.

*Example IV*

This example illustrates the preparation of a copolymer of 2-methyl-5-vinylpyridine and lauryl methacrylate having a mole ratio of 1:1 and a molecular weight of about 75,000, and demonstrates the superior properties of the copolymer as an additive for lubricating oil compositions.

A. A mixture of 1 mole of lauryl methacrylate and 1 mole of 2-methyl-5-vinylpyridine and 0.4% of benzoyl peroxide was placed in a suitable reaction vessel and the mixture heated for a period of about 2 hours at 80° C. in a nitrogen atmosphere. The unreacted materials were stripped off at 185° C. and 1 mm. pressure. The resulting copolymer was a rubbery solid containing 2% nitrogen. Analysis indicated the copolymer had the vinylpyridine and lauryl methacrylate in a mole ratio of 1:1 and a molecular weight of about 100,000.

B. Two percent of the above copolymer was added to mineral lubricating oil and the oil subjected to test I. In this test, the composition had a lacquer rating of 10 compared to a rating of 4 for the control, and gave 55% wear as compared to 100 for the control.

Related results are obtained by replacing the lauryl methacrylate in the above preparation process with equal molar amount of each of the following: stearyl acrylate, stearyl methacrylate, tetradecyl acrylate and eicosanyl acrylate.

*Example V*

This example illustrates the preparation of a copolymer from 2-methyl-5-vinylpyridine and stearyl methacrylate and demonstrates the superior properties of the copolymer as an additive for lubricating oil compositions.

A. A mixture of about 1 mole of stearyl methacrylate, 1 mole of 2-methyl-5-vinylpyridine and 0.4% alpha,-alpha'-azodiisobutyronitrile was placed in a suitable reaction vessel and the mixture reacted for a period of about 2 hours at 65° C. in a nitrogen atmosphere. The unreacted materials were stripped off at 185° C. and 1 mm. pressure. The resulting copolymer was a rubbery solid. Analysis showed the copolymer had the vinylpyridine and the methacrylate ester in a mol ratio of 1:1 and a molecular weight of about 230,000.

B. Two percent of the copolymer produced above was added to mineral lubricating oil and the oil subjected to the above-noted tests. The copolymer showed excellent detergent and anti-wear properties. The composition had a pour point of −10° F. (+20° F. for base lubricating oil), a V. T. R. of 4.81 (5.01 for control) and a V. I. of 124 compared to 64 for the control.

Example VI

This example illustrates the preparation of a copolymer from 2-methyl-5-vinylpyridine and stearyl methacrylate having a mole ratio of 1.2:1 and a molecular weight of 140,000.

A. A mixture of about 1 mole of stearyl methacrylate, 1.2 mole of 2-methyl-5-vinylpyridine and 0.4% alpha,alpha'-azodiisobutyronitrile was placed in a suitable reaction vessel and the mixture reacted for a period of about 2 hours at 65° C. in a nitrogen atmosphere. The unreacted materials were stripped off under vacuum. The resulting copolymer was a rubbery solid. Analysis showed the copolymer had the vinylpyridine and stearyl methacrylate in a mole ratio of 1.2:1 and a molecular weight of 140,000.

B. Two percent of the copolymer produced above was added to mineral lubricating oil and the oil subjected to the above-noted tests. The copolymer showed excellent detergent and anti-wear properties. The composition had a pour point of −15° F. compared to +20° F. for the control, a V. T. R. value of 4.69 and a V. I. of 128 (64 for control).

Related results are obtained by replacing the 2-methyl-5-vinylpyridine in the above process with equal molar amounts of each of the following: 5-ethyl-2-vinylpyridine, 3-vinylpyridine, 4-methyl-2-vinylpyridine and 2-butyl-5-vinylpyridine.

Example VII

This example illustrates the preparation of a copolymer from 2-methyl-5-vinylpyridine and stearyl methacrylate having a mole ratio of 1.8:1 and a molecular weight of about 373,000.

A. A mixture of 1 mole of stearyl methacrylate and 1.75 mole of 2-methyl-5-vinylpyridine and 0.4% benzoyl peroxide was placed in a suitable reaction vessel and the mixture heated at 80° C. in an atmosphere of nitrogen for several hours. The unreacted materials were stripped off under vacuum. The resulting copolymer was a rubbery solid. Analysis showed the copolymer had the vinylpyridine and stearyl methacrylate in a mole ratio of 1.8:1 and a molecular weight of 373,000.

B. Two percent of the copolymer produced above was added to mineral lubricating oil and the oil subjected to the above-noted tests. The copolymer showed good detergent and anti-wear properties and gave a composition having a pour point of −10° F. compared to +20° F. for the control.

Example VIII

A mixture of 1.15 moles of stearyl methacrylate and 1 mole of 2-methyl-5-vinylpyridine and 0.4% alpha,alpha'-azodiisobutyronitrile was placed in a suitable reaction vessel and the mixture heated at 65° C. in an atmosphere of nitrogen for several hours. The unreacted materials were then stripped off under vacuum. The resulting copolymer had a vinylpyridine to stearyl methacrylate ratio of 1.45:1 and a molecular weight of 206,000.

Two percent of the copolymer produced above was added to mineral lubricating oil and the oil subjected to the above-noted tests. The copolymer showed good detergent and anti-wear properties and gave a composition having a pour point of −10° F. compared to +20° F. for the control.

Example IX

One mole of stearyl methacrylate and 1.45 moles of 2-methyl-5-vinylpyridine were combined with 0.5% alpha,alpha'-azodiisobutyronitrile and the mixture heated in an atmosphere of nitrogen at 65° C. for several hours. The unreacted materials were then stripped off under vacuum. The resulting copolymer had a vinylpyridine to stearyl methacrylate ratio of 1.7:1 and a molecular weight of about 306,000.

Two percent of the copolymer produced above was added to mineral lubricating oil and the oil subjected to the above-noted tests. The copolymer showed good detergent and anti-wear properties and gave a composition having a pour point of −15° F. compared to +20° F. for the control. In test II, the composition containing the copolymer had sludge of 52 as compared to 180 for the control. In test VII, the composition had a V. T. R. of 4.62 and a V. I. of 133.

Example X 5.5 moles of stearyl methacrylate and 1 mole of 2-methyl-5-vinylpyridine were combined with 0.2% alpha,alpha'-azodiisobutyronitrile and the mixture heated in an atmosphere of nitrogen at 80° C. for several hours. The unreacted materials were stripped off under vacuum. The resulting copolymer had a vinylpyridine to stearyl methacrylate of 1:4.3 and a molecular weight of 216,000.

Two percent of the copolymer produced above was added to mineral lubricating oil and the oil subjected to the above-noted tests. The copolymer showed good detergent and anti-wear properties. In test III, the composition containing the copolymer had a total sludge rating of 95.5 (100=perfect).

Example XI 2.7 moles of stearyl methacrylate, 5.5 moles of lauryl methacrylate and 1 mole of 2-methyl-5-vinylpyridine were combined with 0.2% alpha,alpha'-azodiisobutyronitrile and the mixture heated in an atmosphere of nitrogen at 80° C. for several hours. The unreacted materials were stripped off under vacuum. The resulting copolymer had a vinylpyridine to the methacrylate esters ratio of 1/2.1/4.3 and a molecular weight of about 300,000.

Two percent of the copolymer produced above was added to mineral lubricating oil and the oil subjected to the above-noted tests. The copolymer showed good detergent properties and anti-wear properties. In test III, the composition containing the copolymer had a total sludge rating of 95.5.

Example XII 10.5 moles of stearyl methacrylate and 1 mole of 2-methyl-5-vinylpyridine were combined with 0.2% alpha,alpha'-azodiisobutyronitrile and the mixture heated in an atmosphere of nitrogen at 80° C. for several hours. The unreacted materials were stripped off under vacuum. The resulting copolymer had a vinylpyridine to methacrylate ester ratio of 1:8 and a molecular weight of 216,000.

Two percent of the copolymer was added to mineral lubricating oil and the oil subjected to the above-noted tests. The copolymer showed good detergent properties and good anti-wear properties.

Example XIII 2.25 moles of stearyl methacrylate and 1 mole of 2-methyl-5-vinylpyridine were combined with 0.2% alpha,alpha'-azodiisobutyronitrile and the mixture heated at 80° C. for 6 hours. The unreacted materials were stripped off under vacuum. The resulting copolymer had a vinylpyridine to acrylate ester ratio of 1:2.1 and a molecular weight of $.25 \times 10^6$.

Two percent of the copolymer produced above was added to mineral lubricating oil and the oil subjected to the above-noted tests. The copolymer showed good detergent properties and anti-wear properties. The composition containing the copolymer had a V. I. of 145 compared to 64 for the control.

*Example XIV*

2.7 moles of stearyl methacrylate, 5.5 moles of lauryl methacrylate and 1 mole of 2-methyl-5-vinylpyridine were combined with 0.2% alpha,alpha'-azodiisobutyronitrile and the mixture heated at 80° C. for 6 hours. The unreacted materials were stripped off under vacuum. The resulting copolymer had the stearyl methacrylate, lauryl methacrylate and vinylpyridine in a mole ratio of 2.1:4.3:1 and a molecular weight of $.25 \times 10^6$.

Two percent of the copolymer produced above was added to mineral lubricating oil and the oil subjected to the above-noted tests. The copolymer showed good detergent properties and anti-wear properties. The composition containing the copolymer had a pour point of $-30°$ F. as compared to $+20°$ F. for the control.

*Example XV*

2.8 moles of stearyl methacrylate, 5.6 moles of lauryl methacrylate and 1 mole of 2-methyl-5-vinylpyridine were combined with 0.2% alpha,alpha'-azodiisobutyronitrile and the mixture heated at 80° C. for 48 hours. The unreacted materials were stripped off under vacuum. The resulting copolymer had the stearyl methacrylate, lauryl methacrylate and vinylpyridine in a mole ratio of 2.6:5.1:1 and a molecular weight of 600,000.

Two percent of the copolymer produced above was added to mineral lubricating oil and the oil subjected to the above-noted tests. The copolymer showed good detergent properties and anti-wear properties. The composition containing the copolymer had a pour point of $-25°$ F. as compared to $+20°$ F. for the control.

*Example XVI*

2.22 moles of stearyl methacrylate and 1 mole of vinylpyridine were combined with 0.2% alpha,alpha'-azodiisobutyronitrile and the mixture heated at 80° C. for 120 hours. The reaction mixture was then dissolved in solvent made up of 1 volume benzene and 5 volumes of a mixture of acetone and methanol (3:1). The copolymer precipitated and was recovered. The copolymer had the stearyl methacrylate and vinylpyridine in a mole ratio of 1.6:1 and a molecular weight of $2 \times 10^6$.

Two percent of the copolymer produced above was added to mineral lubricating oil and the oil subjected to the above-noted tests. The copolymer showed detergent and anti-wear properties. The composition containing the copolymer had a V. I. of 150 (64 for the control) and a pour point of $-5°$ F.

We claim as our invention:

1. An oil-soluble copolymer of (1) a monovinyl-substituted pyridine of the group consisting of pyridines substituted on one of the ring carbon atoms with, as the sole substituted substituent, a vinyl group, and derivatives of the aforedescribed vinylpyridines having a lower alkyl group substituted on a ring carbon atom and (2) a mixture of a $C_{16}$ to $C_{20}$ alkyl ester of an acrylic acid of the group consisting of acrylic acid and methacrylic acid and a $C_{10}$ to $C_{14}$ alkyl ester of an acrylic acid of the group consisting of acrylic acid and methacrylic acid in mole ratios varying from 1:1 to 1:3, said copolymer having the monovinyl pyridine and the combined acrylic acid esters in a mole ratio varying from 1:10 to 5:1 and a molecular weight from $5 \times 10^4$ to $2.5 \times 10^6$.

2. An oil-soluble copolymer as in claim 1 wherein the vinylpyridine is 2-methyl-5-vinylpyridine.

3. An oil-soluble copolymer as in claim 1 wherein the pyridine is 4-vinylpyridine.

4. An oil-soluble copolymer of (1) a monovinyl-substituted pyridine of the group consisting of pyridines substituted on one of the ring carbon atoms with, as the sole substituted substituent, a vinyl group, and derivatives of the aforedescribed vinylpyridines having a lower alkyl group substituted on a ring carbon atom and (2) a mixture of a $C_{16}$ to $C_{20}$ alkyl ester of an acrylic acid of the group consisting of acrylic acid and methacrylic acid and a $C_{10}$ to $C_{14}$ alkyl ester of an acrylic acid of the group consisting of acrylic acid and methacrylic acid in mole ratios varying from 1:1 to 1:3, said copolymer having the vinylpyridine and the combined acrylic esters in a mole ratio varying from 1:6 to 5:1 and a molecular weight from 50,000 to 600,000.

5. An oil-soluble copolymer as in claim 4 wherein the vinylpyridine is 2-methyl-5-vinylpyridine and the acrylic ester is a mixture of stearyl methacrylate and lauryl methacrylate.

6. A process for preparing an oil-soluble copolymer useful as detergent, anti-wear agent and pour point depressant for lubricating compositions which comprises heating a mixture of a monovinyl-substituted pyridine of the group consisting of pyridines substituted on one of the ring carbon atoms with, as the sole substituted subtituent, a vinyl group, and derivatives of the aforedescribed vinylpyridines having a lower alkyl group substituted on a ring carbon atom and a mixture of a $C_{16}$ to $C_{20}$ alkyl ester of an acrylic acid of the group consisting of acrylic acid and methacrylic acid and a $C_{10}$ to $C_{14}$ alkyl ester of an acrylic acid of the group consisting of acrylic acid and methacrylic acid in the presence of from 0.1% to 5% by weight of a peroxide free-radical yielding polymerization catalyst at a temperature between 50° C. and 150° C. so as to form a product having the vinylpyridine and acrylic acid esters in a mole ratio of 1:10 to 5:1, the $C_{16}$ to $C_{20}$ alkyl ester and the $C_{10}$ to $C_{14}$ ester in a ratio of 1:1 to 1:3, and a molecular weight for the copolymer between $5 \times 10^4$ and $2.5 \times 10^6$.

References Cited in the file of this patent

UNITED STATES PATENTS

| | | |
|---|---|---|
| 2,592,107 | Azorlosa | Apr. 8, 1952 |
| 2,737,496 | Catlin | Mar. 6, 1956 |

OTHER REFERENCES

Hackh's Chemical Dictionary, published by McGraw-Hill Book Co., 1944; page 17, acrylic acids.